US008864895B2

(12) United States Patent
Albert et al.

(10) Patent No.: US 8,864,895 B2
(45) Date of Patent: Oct. 21, 2014

(54) AQUEOUS SILANE SYSTEMS FOR BARE CORROSION PROTECTION AND CORROSION PROTECTION OF METALS (75) Inventors: Philipp Albert, Lörrach (DE); Eckhard Just, Rheinfelden (DE); Dirk Laur, Hausen i.W. (DE); Christian Waβmer, Hausen (DE)

(73) Assignee: Evonik Degussa GmbH, Essen (DE)

( * ) Notice: Subject to any disclaimer, the term of this patent is extended or adjusted under 35 U.S.C. 154(b) by 225 days.

(21) Appl. No.: 13/389,561

(22) PCT Filed: Jul. 12, 2010

(86) PCT No.: PCT/EP2010/059977
§ 371 (c)(1),
(2), (4) Date: Apr. 23, 2012

(87) PCT Pub. No.: WO2011/018285
PCT Pub. Date: Feb. 17, 2011

(65) Prior Publication Data
US 2012/0204762 A1 Aug. 16, 2012

(30) Foreign Application Priority Data

Aug. 11, 2009 (DE) .................... 10 2009 028 450
Jun. 15, 2010 (DE) .................... 10 2010 030 111

(51) Int. Cl.
C04B 41/50 (2006.01)
D06M 15/643 (2006.01)
C04B 41/49 (2006.01)
C23C 22/56 (2006.01)
C23C 18/12 (2006.01)
C23C 22/83 (2006.01)
C09D 5/08 (2006.01)
C23C 22/53 (2006.01)
C09D 183/06 (2006.01)
C08G 77/26 (2006.01)
C09D 183/08 (2006.01)

(52) U.S. Cl.
CPC ............... C23C 22/53 (2013.01); C23C 22/56 (2013.01); C23C 18/122 (2013.01); C23C 18/1241 (2013.01); C23C 22/83 (2013.01); C09D 5/084 (2013.01); C09D 183/06 (2013.01); C08G 77/26 (2013.01); C23C 2222/20 (2013.01); C09D 183/08 (2013.01); C23C 2222/10 (2013.01)
USPC ............... 106/287.11; 106/287.1; 106/287.12

(58) Field of Classification Search
USPC ............... 106/287.11, 287.1, 287.12
See application file for complete search history.

(56) References Cited

U.S. PATENT DOCUMENTS

| 4,652,497 | A   | * | 3/1987  | Ascarelli et al. ............... 428/447 |
| 6,461,870 | B2  | * | 10/2002 | Yatscoff et al. .................. 436/56 |
| 6,491,838 | B1  |   | 12/2002 | Standke et al. |
| 6,641,870 | B2  |   | 11/2003 | Bartkowiak et al. |
| 6,685,766 | B2  |   | 2/2004  | Standke et al. |
| 7,427,442 | B2  |   | 9/2008  | Albert et al. |
| 7,578,877 | B2  |   | 8/2009  | Giessler et al. |
| 7,666,257 | B2  |   | 2/2010  | Giessler-Blank et al. |
| 7,670,422 | B2  |   | 3/2010  | Giessler-Blank et al. |
| 7,781,520 | B2  |   | 8/2010  | Standke et al. |
| 7,811,366 | B2  | * | 10/2010 | Inbe et al. .................. 106/14.15 |
| 8,039,110 | B2  |   | 10/2011 | Jenkner et al. |
| 8,101,682 | B2  |   | 1/2012  | Standke |
| 8,188,266 | B2  |   | 5/2012  | Edelmann et al. |
| 8,430,972 | B2  | * | 4/2013  | Inbe et al. ..................... 148/247 |
| 8,436,093 | B2  |   | 5/2013  | Inbe et al. |
| 2007/0054056 | A1 |   | 3/2007  | Albert et al. |
| 2007/0110906 | A1 |   | 5/2007  | Edelmann et al. |
| 2007/0110912 | A1 |   | 5/2007  | Standke |
| 2008/0058489 | A1 |   | 3/2008  | Edelmann et al. |
| 2008/0081212 | A1 |   | 4/2008  | Inbe et al. |
| 2008/0187673 | A1 |   | 8/2008  | Standke et al. |
| 2008/0206572 | A1 |   | 8/2008  | Edelmann et al. |
| 2009/0005518 | A1 |   | 1/2009  | Just et al. |
| 2009/0007818 | A1 |   | 1/2009  | Militz et al. |
| 2009/0022898 | A1 |   | 1/2009  | Standke et al. |
| 2010/0119851 | A1 |   | 5/2010  | Giessler-Blank et al. |
| 2010/0159144 | A1 |   | 6/2010  | Standke et al. |

(Continued)

FOREIGN PATENT DOCUMENTS

EP   1 101 787    5/2001
EP   1 992 718    11/2008

(Continued)

OTHER PUBLICATIONS

Office Action issued Jul. 10, 2013 in Japanese Patent Application No. 2012-524170 (submitting German translation only).
U.S. Appl. No. 13/580,194, filed Aug. 21, 2012, Borup, et al.
U.S. Appl. No. 13/638,702, filed Oct. 25, 2012, Friedel, et al.
U.S. Appl. No. 13/638,733, filed Oct. 1, 2012, Friedel, et al.
U.S. Appl. No. 13/638,734, filed Oct. 1, 2012, Friedel, et al.
U.S. Appl. No. 13/640,638, filed Oct. 11, 2012, Friedel, et al.
U.S. Appl. No. 13/638,619, filed Oct. 1, 2012, Friedel, et al.
International Search Report Issued Oct. 14, 2010 in PCT/EP10/59977 Filed Jul. 12, 2010.
U.S. Appl. No. 13/258,724, filed Oct. 24, 2011, Albert, et al.
U.S. Appl. No. 14/007,481, filed Sep. 25, 2013, Albert, et al.

(Continued)

Primary Examiner — James McDonough
(74) Attorney, Agent, or Firm — Oblon, Spivak, McClelland, Maier & Neustadt, L.L.P.

(57) ABSTRACT

The present invention relates to a furnace (12) for melting heated glass using burners (13), wherein the combustion energy is at least partially produced by oxy-fuel combustion, and wherein at least a portion of the oxygen used in the burners (13) is produced by separation, on a ceramic separation membrane (18), from a gaseous mixture including oxygen, the oxygen from the separation being directly channeled into at least one burner (13).

12 Claims, 10 Drawing Sheets (56) References Cited

U.S. PATENT DOCUMENTS

| | | |
|---|---|---|
| 2010/0191001 A1 | 7/2010 | Wassmer et al. |
| 2010/0209719 A1* | 8/2010 | Borup et al. .................. 428/447 |
| 2011/0124794 A1 | 5/2011 | Friedel et al. |
| 2011/0178238 A1 | 7/2011 | Koschabek et al. |
| 2011/0259240 A1 | 10/2011 | Jenkner et al. |
| 2011/0268899 A1 | 11/2011 | Albert et al. |
| 2011/0308423 A1 | 12/2011 | Friedel et al. |
| 2012/0204762 A1 | 8/2012 | Albert et al. |

FOREIGN PATENT DOCUMENTS

| | | |
|---|---|---|
| JP | 2007 177314 | 7/2007 |
| JP | 2007-177314 A | 7/2007 |
| JP | 2007-262577 A | 10/2007 |
| WO | 2004 009714 | 1/2004 |
| WO | 2005 014741 | 2/2005 |
| WO | WO 2007/100065 A1 | 9/2007 |
| WO | 2009 030538 | 3/2009 |
| WO | 2011 103939 | 9/2011 |

\* cited by examiner

Example 1: a)

Example 1: b)

Example 1: c)

Example 1: d)

Fig. 1

Example 2: a)  Example 2: b)

Example 2: c)  Example 2: d)

Fig. 2

Fig. 2A

Example 3: a)  Example 3: b)

Example 3: c)  Example 3: d)  Example 3: e)

Fig. 3

Example 4: a)

Example 4: b)

Example 4: c)

Fig. 4

Example 5: a)

Example 5: b)

Example 5: c)

Fig. 5

Example 6: a)

Example 6: b)

Example 6: c)

Example 6: d)

Fig. 6

Fig. 6A

Example 7: a)

Example 7: b)

Example 7: c)

Example 7: d)

Fig. 7

Fig. 7A

AQUEOUS SILANE SYSTEMS FOR BARE CORROSION PROTECTION AND CORROSION PROTECTION OF METALS

The present invention relates to a novel aqueous, silane-based composition and also to its production and use, particularly in corrosion protection of metals.

Aluminum, steel, galvanized steel and other metals corrode when exposed to the atmosphere. Galvanized surfaces of steel in particular exhibit formation of white rust after just a few hours of exposure to the atmosphere. This formation of white rust is undesirable because it is very disadvantageous for painting these surfaces for example. Therefore, galvanized surfaces are treated with mineral oil or passivated directly after galvanization of the steel.

Silanes have long been used as primers/adhesion promoters between inorganic substrates and organic coatings. The quality of the adhesive bonding between the metal, the silane and the organic coating is influenced by many parameters. The quality of the adhesive bonding depends inter alia on the metal alloy, since the composition of the metal surface determines the Si—O-metal bond and the stability of the Si—O-metal bond depends on the type of metal.

Silanes as well as sol-gel systems have long been used in corrosion protection. For this, silanes are used not only as primers/adhesion promoters, but also as topcoat/corrosion control coat. Silanes and waterborne sol-gel systems have the great advantage of generally being environmentally friendly.

U.S. Pat. No. 6,955,728 describes treating a metal surface with an aqueous solution of an acetoxysilane and a bis(trialkoxysilylalkyl)amine, and claims bare corrosion protection of metal substrates and also corrosion protection in combination with an organic coating.

U.S. Pat. No. 9,931,324 describes the use of silane systems consisting of a bis(trialkoxysilylalkyl)amine, a bis(trialkyloxysilylalkyl)polysulfane and also an organic solvent and water. The silanized surface of the metal is electrocoated in a 2nd step. The samples are subsequently exposed to an accelerated corrosion test and sub-film migration at the scribe mark is determined. The claimed systems show minimal sub-film migration at the scribe mark.

DE 101 49 148 claims a process for coating metallic surfaces, especially aluminum, iron, copper, magnesium with an aqueous composition. The aqueous composition contains as well as water, organic film-forming agents, inorganic particles, slip agents, optionally an organic solvent, optionally a silane/siloxane, optionally at least one organic corrosion inhibitor and also optionally a crosslinking agent based on a basic compound. Formulations based on the invention claimed exhibit no surface corrosion in the condensation cycling test even after 10 cycles.

DE 10 2004 037 045 relates to a composition based on reacting a glycidyloxypropylalkoxysilane with an aqueous silica sol, an organic acid and also n-propyl zirconate, butyl titanate or titanium acetylacetonate. Such a composition provides hydrophobic and oleophobic coatings on metals and other substrates.

WO 2004/076718 relates to a process for coating a metallic surface with a composition that is aqueous or else contains organic solvent and which is substantially free of Cr(VI) compounds. The composition is said to contain at least one hydrolyzable fluorine-free silane and also at least one hydrolyzable fluorine-containing silane. The composition is said to further contain at least one compound in inorganic particulate form, a slip agent, an organic corrosion inhibitor, a corrosion control pigment and also further components. Aluminum alloys treated first with a conversion coating based on cerium-rich rare earth compounds and given a subsequent treatment with said composition exhibited corrosion resistances which were comparable to a classic yellow chromate coating.

WO 2004/076717 claims a process for coating a metallic surface with an aqueous composition for treating or for pretreating a further coating. The aqueous composition contains at least one hydrolyzable silane and also at least one metal chelate. The composition further contains at least one organic film-forming agent, inorganic particles, a slip agent, an organic corrosion inhibitor, a corrosion control pigment and also further components. Such a composition provides chromium-free coatings which, despite a layer thickness of just 0.5 to 2.0 µm, are said to be of high quality.

US 2008/02135598 claims a coating material consisting of organofunctional silanes, an organic crosslinker, an organometallic compound, a hydrolysis catalyst, a crosslinkable prepolymer, organic and inorganic corrosion inhibitors and also further components. The coating system is applied in a layer thickness of 3 to 15 µm and can be cured for 24 h at room temperature or 1 h between 60 and 120° C. The coating system shows no sub-film migration at the scribe mark in the salt spray test on AA2024 aluminum alloy even after 500 h. However, it has to be noted that said coating systems have to be applied to the metal surface directly after production.

WO 2009/055020 relates to a coating notable for low friction, high abrasion resistance and good corrosion resistance. The system consists of 2 components. Component 1 consists of an organofunctional alkoxysilane, a hydrolysis catalyst, for example titanium or zirconium alkoxide, an adhesion promoter and also a flow control agent. The second component consists of a slip agent.

JP 2005290534 claims corrosion control layers on aluminum-zinc-coated steel. The composition consists of vanadium(IV) compounds, phosphates/phosphoric acid, water-soluble/dispersible resins, methacrylic acid and also further components. The resins are synthesized from epoxy-functional and amino-functional silanes.

JP 1996232618 discloses a formulation for coating galvanized surfaces of steel. The coating is composed of a polymer emulsion, an organofunctional silane and also at least one metal ion from the group Al, Mg, Ca, Zn, Ni, Co, Fe, Zr, Ti, W and Mn. The formulation is not stable in storage and forms an uninterrupted film on the surface which is said to protect against white rust.

WO 2004/009714 claims a composition which can be applied to metal substrates as a primer or as bare corrosion protection. The composition consists of a water-soluble organofunctional silane and a leachable inhibitor. Chromate(VI) and cerium(III) ions are adduced as inhibitor.

DE 197 45 801 reveals a process for coating metals. Metal substrates mentioned include steel, tinplated steel, galvanized steel or aluminum. From a solution or dispersion, 2- to 4-valent metal and/or phosphate ions are applied to the metal surface in the presence of an organic film-forming agent. The composition may also contain a glycidyloxypropyltrimethoxysilane, a tetraethoxysilane or aminopropyltriethoxysilane as additive. The formulations which do contain a silane as additive exhibit particularly low sub-film migrations at the scribe mark.

JP 63186777 claims a composition useful as anticorrosive primer on metal surfaces. The formulation is composed of a water-soluble/dispersible organic/inorganic reaction product, a water-soluble/dispersible organic resin, a trialkoxysilane and also Cr(VI) and Cr(III) salts/compounds. The composition has to be applied after mixing.

U.S. Pat. No. 4,450,255 claims an aqueous composition for corrosion-inhibiting coatings on metal substrates. The formulation contains colloidal alumina—in situ from alkoxyaluminum—alkyltrimethoxysilane, acetic acid, isopropanol, water and colloidal silica. Aluminum was coated and the sol-gel system was cured at 120° C. for 6 h. In the copper-accelerated corrosion test, corrosion was observed after 72 h.

EP 2 009 073 teaches an alcoholic, chromium-free solution consisting of an alkoxysilane oligomer. The silicon atoms in the oligomer are partly replaced by titanium atoms. The solution is applied to the galvanized surface by dipping and spin coating. Layer thickness is 0.5 to 3.0 mm and curing is done at 120° C.

JP 2007177314 claims a composition for treatment of metal surfaces, especially steel and galvanized steel, against corrosion. The composition consists of a silica sol, an epoxysilane, and/or an aminosilane, an oligomeric alkoxysilane (tetraalkoxysilane), phosphate ions, fluoride ions, and also metal ions from the series V, Ti, Zr, Zn, Mn, Mg, Al, Co, Ni, Mo, W, and Ce. The formulation is said to offer good stability in storage as well as good corrosion control. In addition, the coating is said to be acid, base and abrasion resistant.

WO 2008/003273 claims a corrosion-resistant coating which consists of 3 layers which are each free of Cr(VI). The substrate material consists essentially of a phosphatized steel or of a phosphatizable Fe-based alloy. To the phosphatization layer is applied wet-chemically a silane layer and to the silane layer a modified polysiloxane layer. Zinc-phosphatized substrates of steel were coated and the corrosion resistance was tested using condensation cycling climate tests (DIN ISO 3231) in a sulfur dioxide atmosphere. Better resistance was found than for single-layered coatings.

JP 1996206042 claims an aqueous formulation consisting of water-soluble metal salts and additives. The acetates contain metal ions from the groups of periods 4 and 5 of transition group IIB, from periods 4 and 6 of transition group IB, from periods 4 to 6 of main groups IVA, VA, VIA of the periodic table and also further metal ions. The formulation further contains a water-soluble resin and also gamma-glycidyloxypropyltrimethoxysilane. The coating is said to specifically inhibit edge sub-film migration and protect against corrosion.

WO 2005/078026 discloses a formulation for anticorrosion coating of metallic parts. The formulation contains organic titanates and/or zirconates, metal powder or a mixture of metal powders and also a silane-based binder and water. The coated metallic parts were tested in a standard salt spray test (ISO 9227). Compared with conventional systems, the coating of the invention is said to have a 2 to 3 times higher resistance in the salt spray mist.

WO 2007/119023 claims a formulation comprising nanoparticles which is useful as protective coat for metal surfaces. The binder consists, for example, of a copolymer which contains gamma-glycidyloxypropyltrimethoxysilane and tetramethoxysilane.

The nanoparticles are said to be from 2 to 100 nm in size and can be formed of Al-, Ce-, Si-, Zr-, Sn-alkoxides. The coating is said to possess good scratch resistance as well as good corrosion control.

In Electrochimica Acta (2009), 54 (9), 2655-2662 the influence of cerium(IV) ions on the condensation polymerization of 1,2-bis(triethoxysilyl)ethane was investigated. This was done using various methods such as impedance spectroscopy, atomic force microscopy, IR spectroscopy, nuclear magnetic resonance spectroscopy and thermogravimetry. It was found that the cerium(IV) ions are responsible for the formation of a more uniform film of silane.

In Surface and Coatings Technology (2004), 187 (2-3), 216-224 the aluminum alloy 2024-T3 was rinsed with a Cr(VI) solution or alternatively with a 4% 1,2-bis(triethoxysilyl)ethane solution following zinc phosphatization. It was observed that the treatment with 4% 1,2-bis(triethoxysilyl)ethane solution gives comparable corrosion test results to Cr(VI) solution. The 1,2-bis(triethoxysilyl)ethane solution is based on organic solvents.

The problem addressed by the present invention is that of providing an environmentally friendly, waterborne and storage-stable system that offers good bare corrosion protection on metals. In addition, the bare corrosion protection should offer durable corrosion protection with common coating systems. A particular concern was to treat galvanized surfaces of steel alternatively, since they are often treated with Cr(VI) solutions and the use of Cr(VI) compounds is to be avoided. Furthermore, corrosion protection systems based on Cr(III) typically also contain Co(II) ions. Therefore, one objective was also to replace where possible further toxic heavy metal ions by means of aqueous silane systems. More particularly, the toxic cobalt ions in Cr(III) coatings were to be replaced without incurring the penalty of disadvantages in corrosion protection.

BRIEF DESCRIPTION OF THE DRAWINGS

Figure 1:
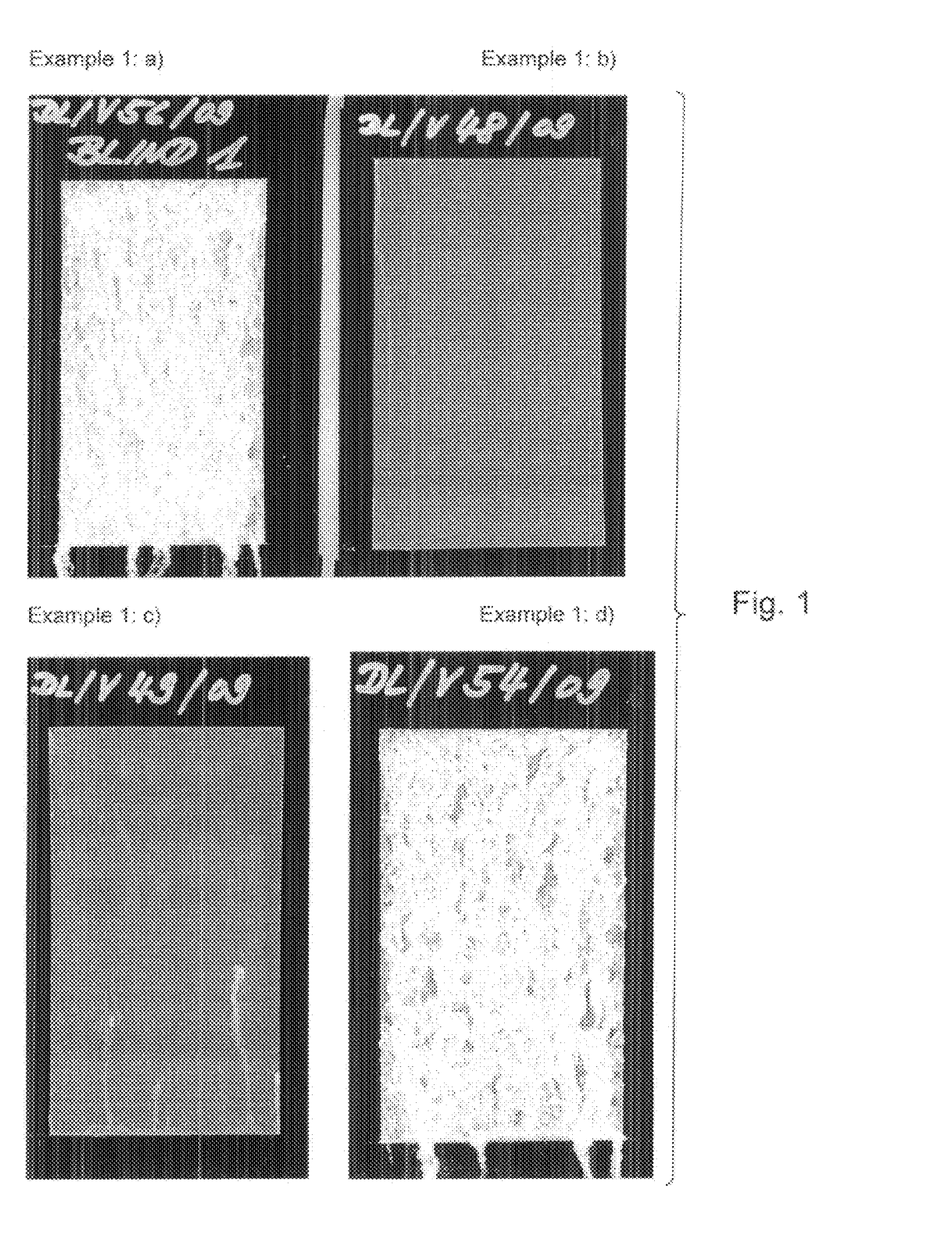

FIG. 1 shows the test panels obtained in Example 1 of the specification.

Figure 2:
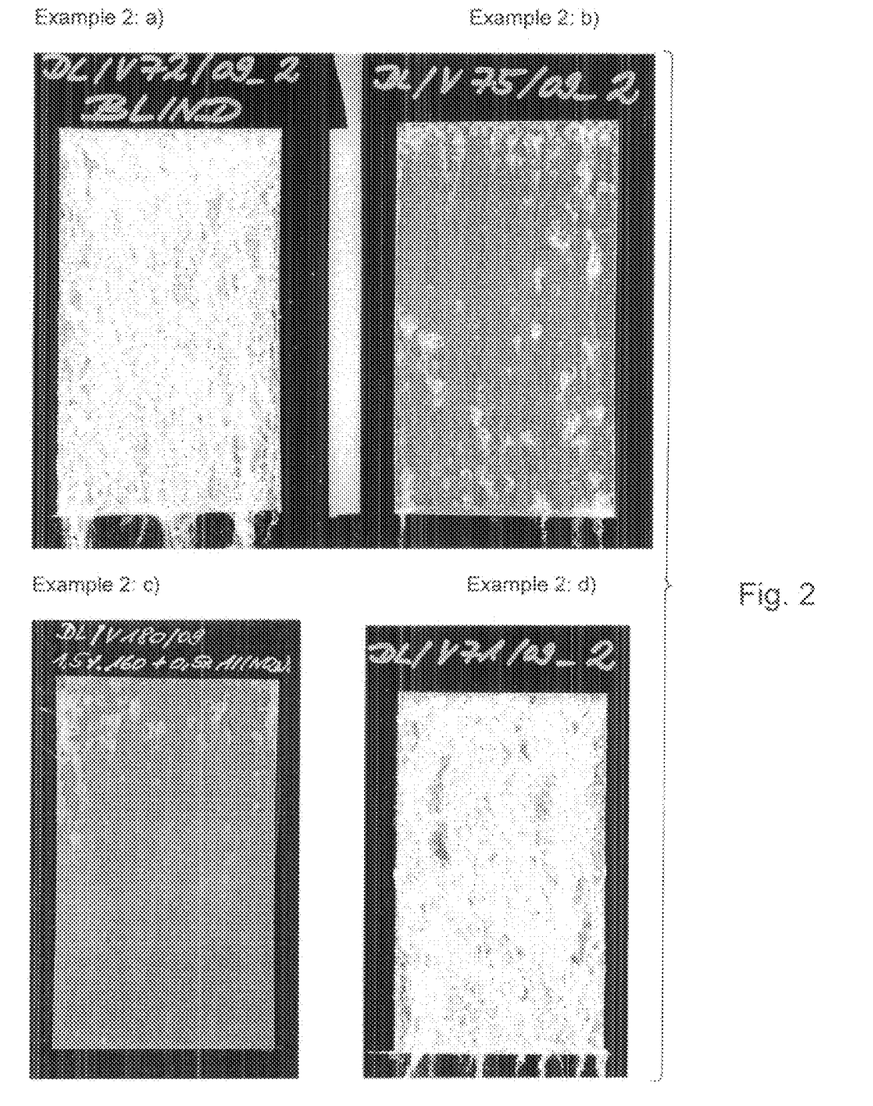
Figure 2A:
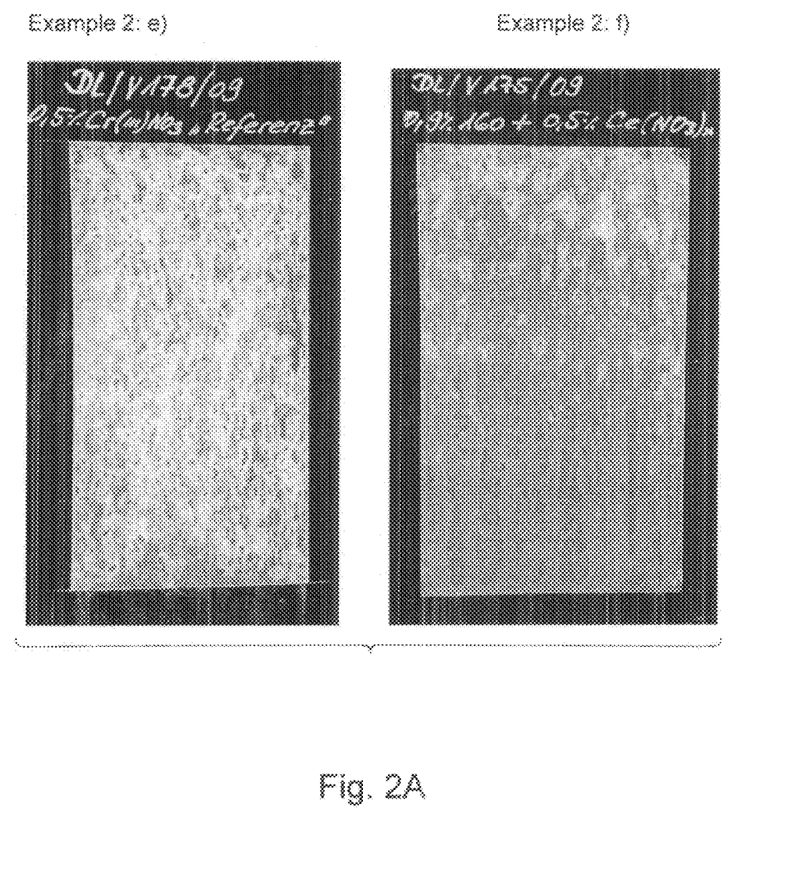

FIG. 2 and FIG. 2A show the test panels obtained in Example 2 of the specification.

Figure 3:
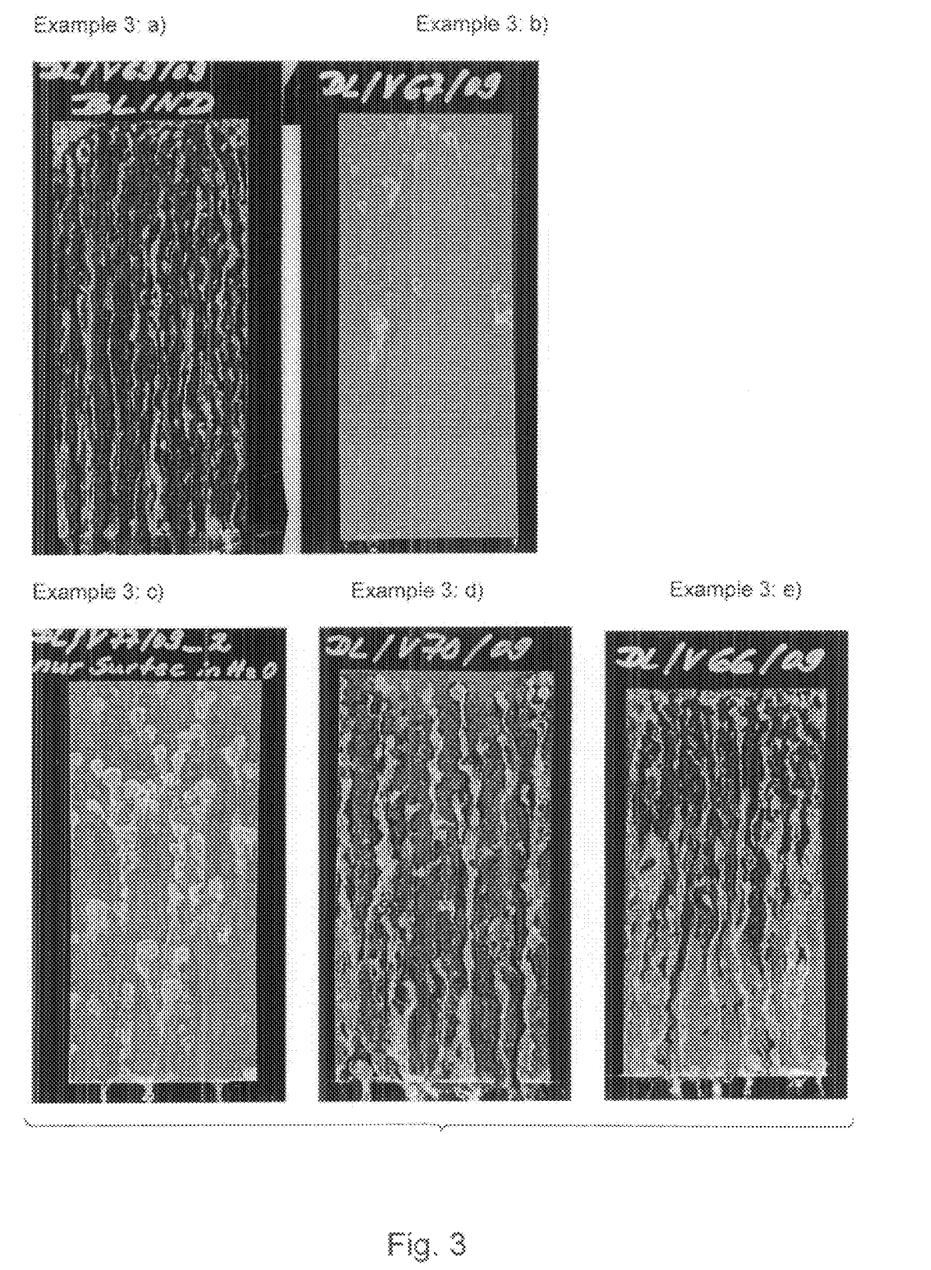

FIG. 3 shows the test panels obtained in Example 3 of the specification.

Figure 4:
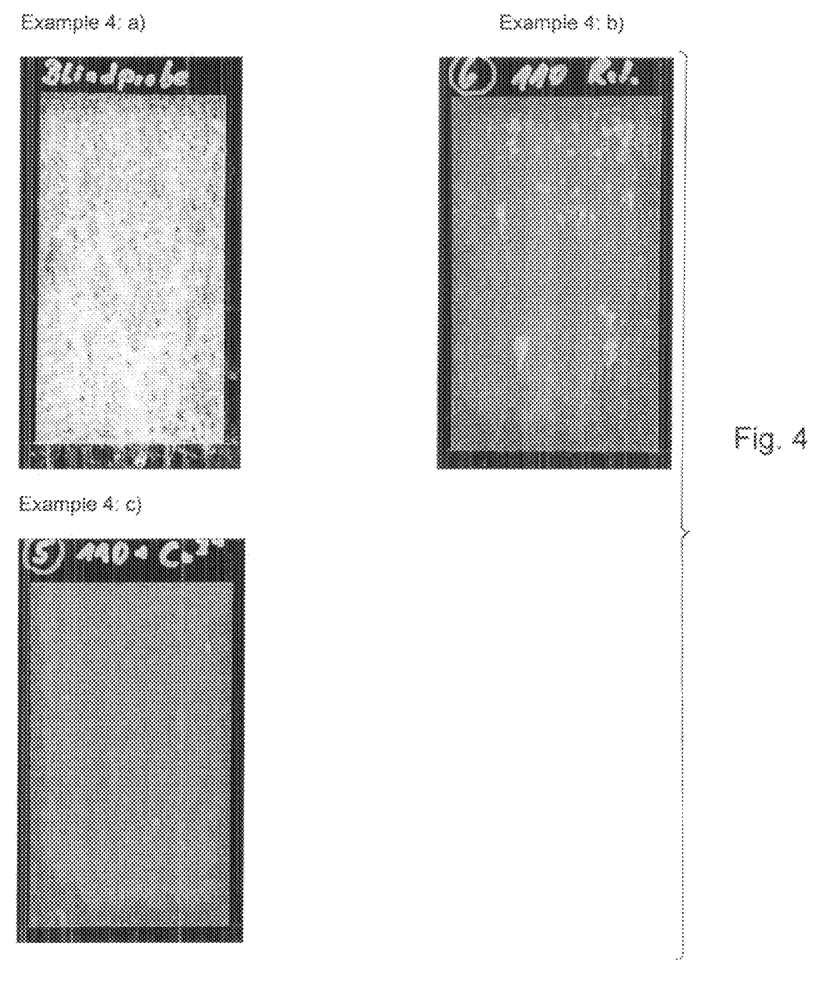

FIG. 4 shows the test panels obtained in Example 4 of the specification.

Figure 5:
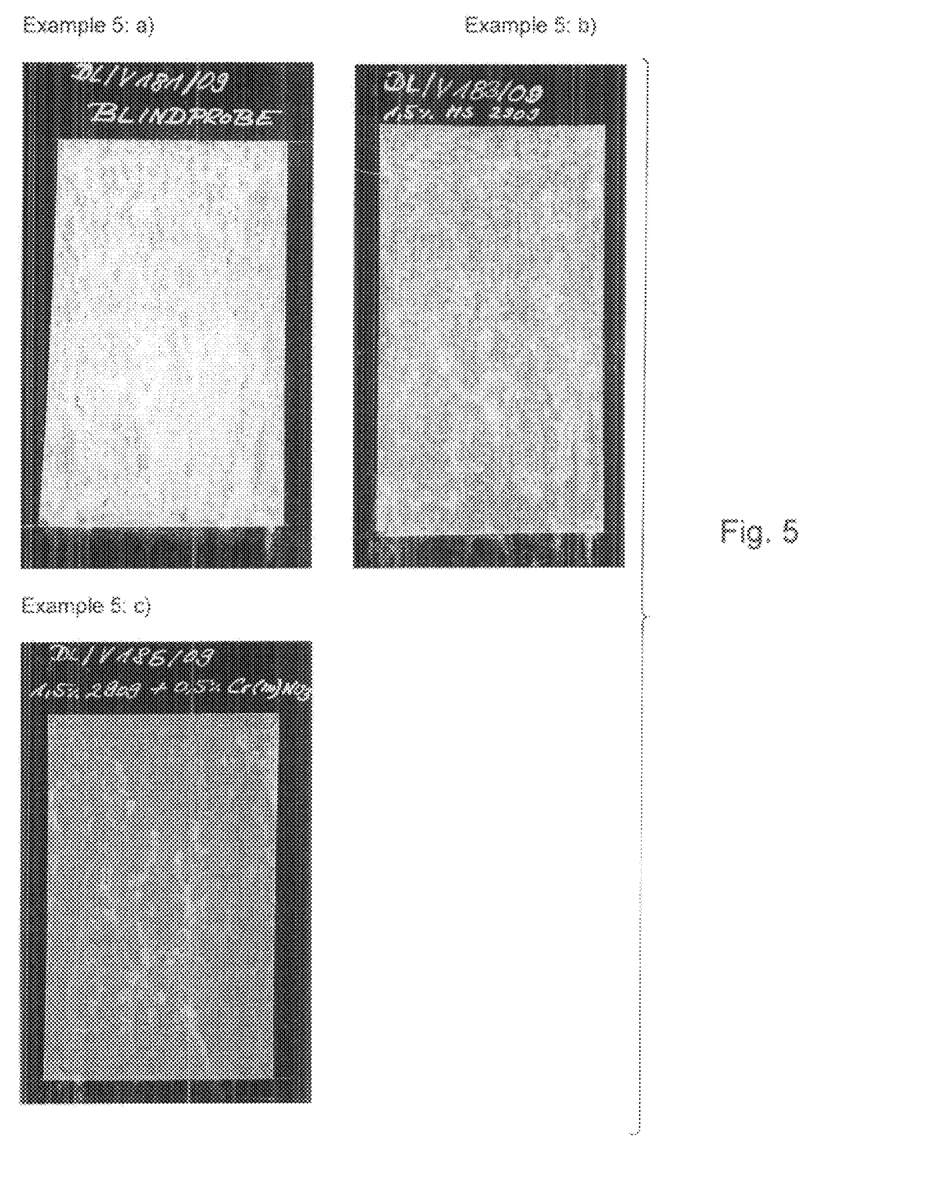

FIG. 5 shows the test panels obtained in Example 5 of the specification.

Figure 6:
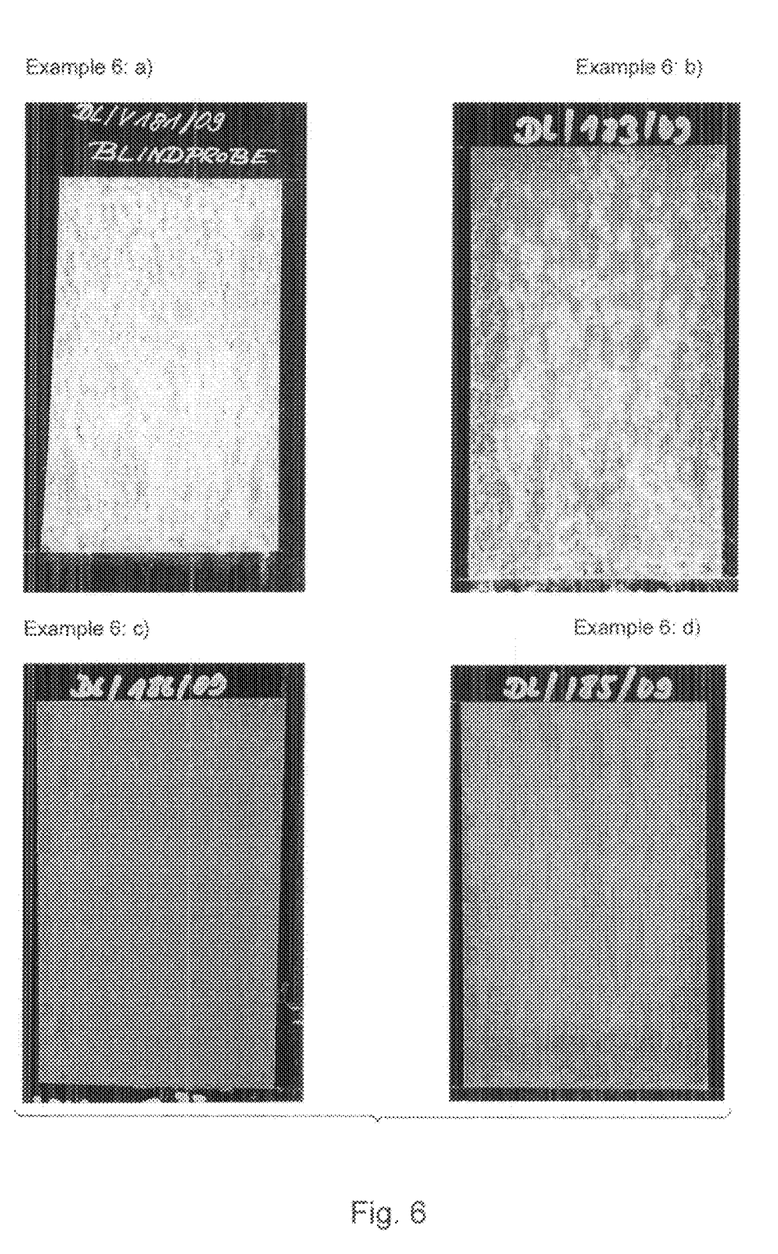
Figure 6A:
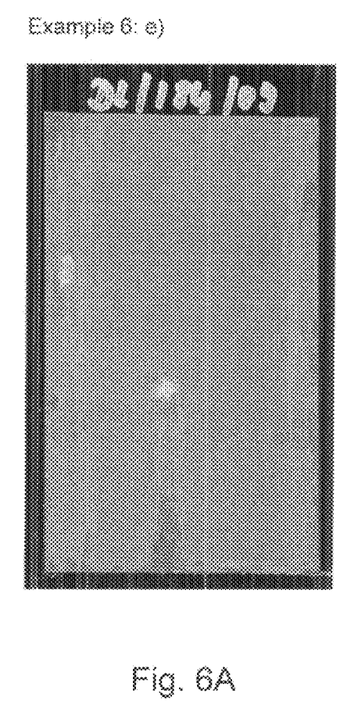

FIG. 6 and FIG. 6A show the test panels obtained in Example 6 of the specification.

Figure 7:
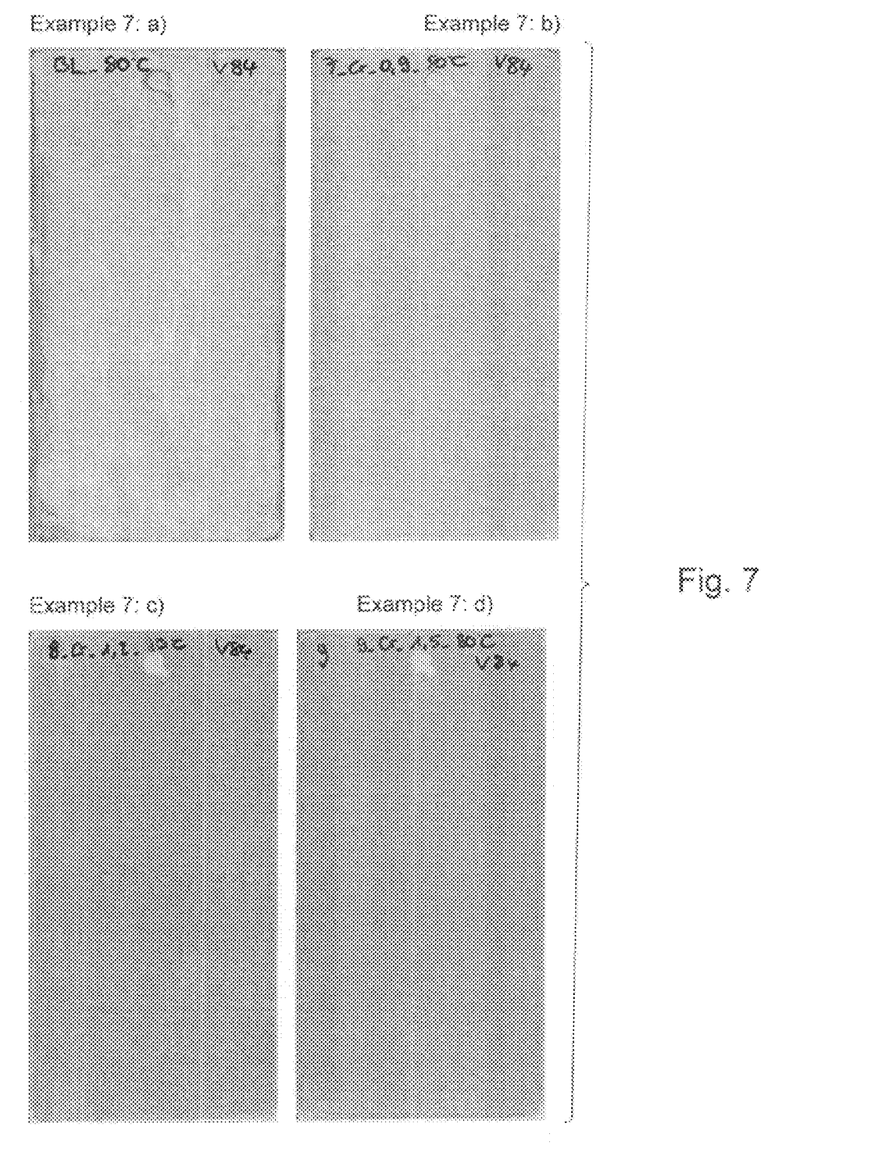
Figure 7A:
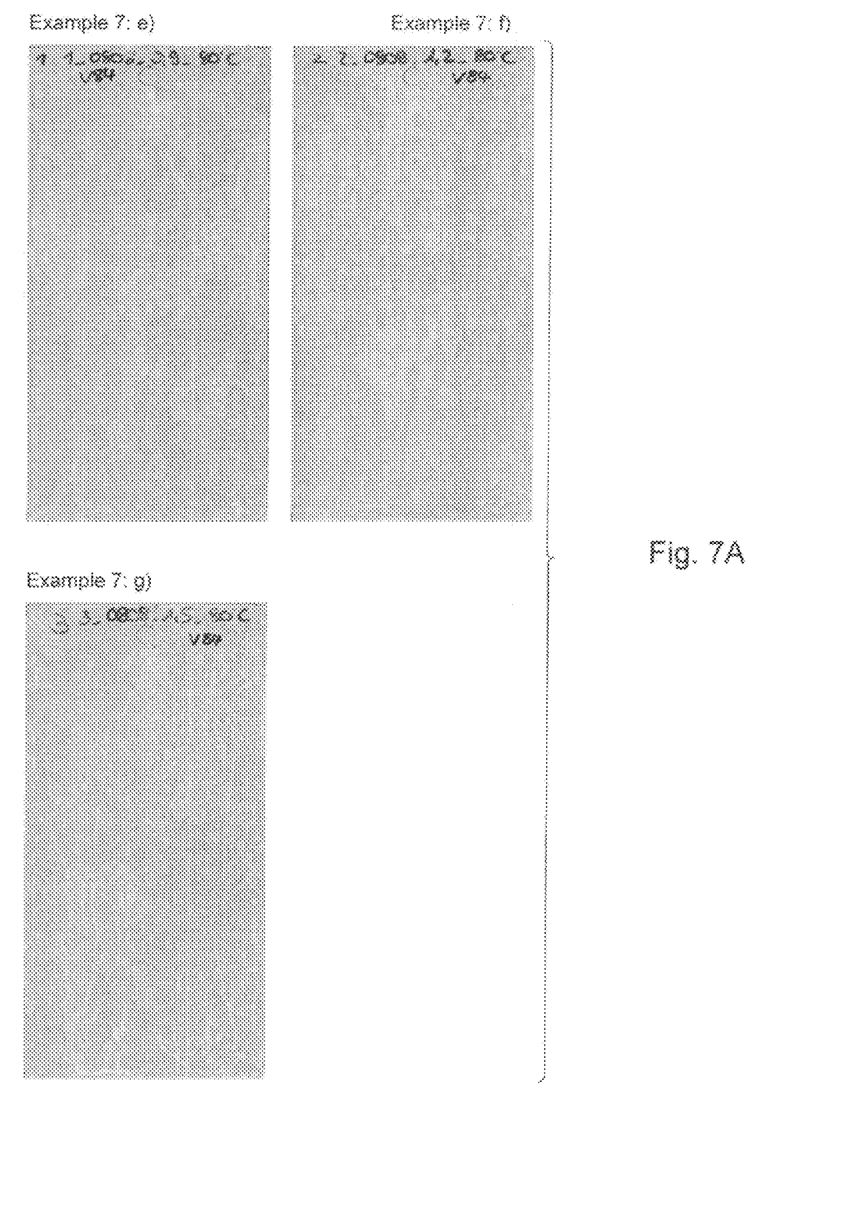

FIG. 7 and FIG. 7A show the test panels obtained in Example 7 of the specification.

The problem is solved according to the present invention by the features in the claims.

Surprisingly, metal salts added to storage-stable, aqueous and almost VOC-free silane systems were found to substantially increase the bare corrosion protection on metal substrates. This holds not just for untreated metal surfaces, but also for, for example, phosphatized or chromitized metal surfaces. The metal salts advantageously used are preferably the nitrates or acetates of chromium(III), aluminum(III), zinc (II), vanadium(II), vanadium(V), manganese(II), copper(II), cerium(III), cerium(IV) and also molybdenum(VI) and also tungsten(VI) or mixtures of two or more thereof. In the case of vanadium(V), molybdenum(VI) and tungsten(VI), said "metal salts" also comprehends corresponding vanadates, molybdates, tungstates, for example those of ammonium, and also molybdic acid and tungstic acid. The metal salt used in particular is a $Cr^{3+}$ salt or a mixture of at least two metal salts, preferably a mixture of $Cr^{3+}$ and $Al^{3+}$ salts, a mixture of $Cr^{3+}$ and $Ce^{3+}$ salts, a mixture of $Cr^{3+}$ and $Ce^{4+}$ salts, a mixture of $Cr^{3+}$, $Ce^{3+}$ and $Ce^{4+}$ salts, a mixture of $Cr^{3+}$, $Al^{3+}$ and $Ce^{3+}$ salts or a mixture of $Cr^{3+}$, $Al^{3+}$, $Ce^{4+}$ and $Ce^{3+}$ salts, and particular preference is given to using a metal salt from the series of nitrates and acetates. Said salts/metal salts or their aqueous solution can be added to the aqueous silane formulation in the appropriate concentration and used with advantage after good commixing of the solution. It is also advantageous to allow such a solution to ripen for one day at 20° C. before it is used. The substrates to be treated are generally first cleaned. The way the metal surface is cleaned depends on the metal substrate and the degree of soiling. Zinc surfaces for example can be cleaned in an alkaline bath of surfactant and then be rinsed with deionized water.

Substrates and substrate surfaces, more particularly metal substrates, to be treated according to the present invention can be dipped into the solution at room temperature or else at higher temperature. However, it is also possible to treat the substrates by spraying. The resulting overspray can be collected and reused. Following application of a composition according to the present invention, the treated substrate can be dried at ambient temperature, preferably above 20° C. and more preferably at a temperature in the range from 40° C. to 120° C. or else at a higher temperature above 120° C. to cure the formulation of the present invention. The drying/curing/crosslinking can be carried out in an oven, using a hot air blower, a blower or else an IR radiator. The drying and curing time generally depends on the substrate type, the size, geometry of metal parts and also the drying and curing temperature, and can take from several seconds up to several minutes or else days.

Aqueous compositions according to the present invention—notwithstanding addition of metal ions to a silane system—are notable for excellent stability in the course of storage at room temperature for more than three months and outstanding properties on the part of metal surfaces and bare metal surfaces treated therewith. Especially metal surfaces of iron or iron alloys, steel, galvanized steel, phosphatized steel, chromatized/chromitized steel, aluminum, aluminum alloys, titanium, titanium alloys, magnesium, magnesium alloys, copper, zinc and also alloys containing one or more of the aforementioned metals, such as magnesium alloys or aluminum alloys, to mention just a few examples, are advantageously treatable in a simple and economical manner with a composition of the present invention. Metal surfaces thus treated are notable for excellent and durable resistance to corrosion. Moreover, metal surfaces thus coated are supremely coatable with further coating systems, such as liquid paints or powder paints, more particularly waterborne or solventborne liquid paints, in that very good adherence of additional coatings is achievable. In addition, compositions according to the present invention are free of toxic cobalt and chromium(VI). Aqueous compositions according to the present invention are also low in/essentially free of volatile organic compounds (VOCs) and hence environment- and/or climate-friendly.

The present invention accordingly provides a process for producing an aqueous composition by
  (i) specific hydrolysis and condensation/cocondensation (—the term condensation/cocondensation here and hereinbelow includes block condensation/cocondensation—) of one or more than one aminoalkylalkoxysilane from the series of monoaminoalkylalkoxysilanes, bisaminoalkylalkoxysilanes and trisaminoalkylalkoxysilanes and optionally one or more than one alkoxysilane from the series of fluoroalkylalkoxysilanes, alkylalkoxysilanes and tetraalkoxysilanes,
  (ii) in the presence of one or more than one hydrolysis/condensation catalyst and water wherein the amount of water used per mole of a deployed silane as per (i) is preferably in the range from 0.5 to 100 moles of water, more preferably in the range from 1.5 to 50 moles of water and even more preferably in the range from 2 to 30 moles of water, and also in the optional presence of one or more than one solvent/diluent,
  (iii) then removing from the reaction mixture the solvent/diluent and also the hydrolysis alcohol, formed in the course of the hydrolysis and condensation/cocondensation, at least partially (to leave what will hereinbelow also be referred to as stock solution as per A or stock solution A or stock solution for short),
  (iv) optionally adding water and/or an aqueous acid to the reaction mixture as per (iii), wherein the pH of the reaction mixture is set to a value in the range from 2 to <7, and
  (v) subsequently adding at least one metal salt from the series of zinc, vanadium in oxidation state 2+ or 5+, molybdenum in oxidation state 6+, tungsten in oxidation state 6+, manganese in oxidation state 2+, aluminum, chromium in oxidation state 3+, copper in oxidation state 2+ and cerium in oxidation state 3+ or 4+ and/or adding an aqueous solution of one or more than one of the aforementioned metal salts.

The process of the present invention preferably utilizes a metal salt from the series of nitrates or acetates. Metal salts particularly advantageous for use according to the present invention include aluminum(III) nitrate, aluminum(III) acetate, chromium(III) nitrate, chromium(III) acetate, zinc (II) nitrate, zinc(II) acetate, copper(II) nitrate, copper(II) acetate, manganese(II) nitrate, manganese(II) acetate, vanadium(II) nitrate, vanadium(II) acetate, vanadium(V) acetate, vanadium(V) nitrate, vanadyl(V) nitrate, vanadyl(V) acetate, cerium(III) nitrate, cerium(III) acetate or mixtures of two or more thereof.

But it is also possible to use other water-soluble metal salts of the aforementioned selected metals.

The aminoalkylalkoxysilane used in the process of the present invention preferably comprises
  monoaminoalkylalkoxysilanes, such as aminopropyltrimethoxysilane, aminopropyltriethoxysilane, aminoethyltrimethoxysilane, aminoethyltriethoxysilane, aminomethyltrimethoxysilane, aminomethyltriethoxysilane, aminopropylmethyldimethoxysilane, aminopropylmethyldiethoxysilane, N-n-butylaminopropyltrimethoxysilane, N-n-butylaminopropyltriethoxysilane, aminoethylaminopropyltrimethoxysilane, aminoethylaminopropyltriethoxysilane, so-called triaminoalkylalkoxysilanes, such as aminoethylaminoethylaminopropyl-trimethoxysilane or aminoethylaminoethylaminopropyltriethoxysilane, bisaminoalkylalkoxysilanes or bis(trimethoxysilylmethyl)amines, such as bis(triethoxy-silylmethyl)amine, bis(trimethoxysilylethyl) amine, bis(triethoxysilylethyl)amine, bis(tri-methoxysilylpropyl)amine, bis(triethoxysilylpropyl)amine, bis(trimethoxysilylisopropyl)-amine, bis(triethoxysilylisopropyl) amine, and also trisaminoalkylalkoxysilanes or tris (trimethoxysilylmethyl)amines, such as tris (triethoxysilylmethyl)amine, tris(trimethoxysilylethyl) amine, tris(triethoxysilylethyl)amine, tris (trimethoxysilylpropyl)amine, tris(triethoxysilylpropyl) amine, tris(trimethoxysilylisopropyl)amine, tris (triethoxysilylisopropyl)amine, or mixtures of two or more thereof.

It is further possible to use one or more than one alkoxysilane from the series of fluoroalkylalkoxysilanes, alkylalkoxysilanes and tetraalkoxysilanes, for example tridecafluoro-1, 1,2,2-tetrahydrooctyltrimethoxysilane, tridecafluoro-1,1,2, 2-tetrahydrooctyltriethoxysilane, methyltrimethoxysilane, methyltriethoxysilane, ethyltrimethoxysilane, ethyltriethoxysilane, n-propyltrimethoxysilane, n-propyl-triethoxysilane, isobutyltrimethoxysilane, isobutyltriethoxysilane, octyltrimethoxysilane, octyltriethoxysilane, tetramethoxysilane, tetraethoxysilane or mixtures of two or more thereof.

In addition, however, it is also possible to use corresponding partially hydrolyzed/precondensed silanes/silane mixtures.

Examples of suitable solvents or diluents are alcohols, such as methanol, ethanol or isopropanol—to mention but a few examples.

The hydrolysis/condensation catalyst used can be for example—but not exclusively—an organic or inorganic acid, such as formic acid, acetic acid, aqueous nitric acid, phosphoric acid or else a phosphonic acid.

A composition according to the present invention is produced using preferably from 0.5 to 50 parts by weight, more preferably from 1 to 30 parts by weight, even more preferably from 2 to 20 parts by weight, yet even more preferably from 5 to 15 parts by weight and especially from 7 to 12 parts by weight of a stock solution A, from 1 to 100 parts by weight and preferably from 10 to 90 parts by weight of completely ion-free water, from 0 to 100 parts by weight of aqueous acid and from 0.01 to 5 parts by weight, preferably from 0.1 to 3 parts by weight, more preferably from 0.2 to 2 parts by weight, even more preferably from 0.3 to 1.5 parts by weight and especially from 0.5 to 1 part by weight of metal salt.

The level of metal salt used in the final composition is preferably from 0.01% to 6% by weight, more preferably from 0.05% to 3% by weight, even more preferably from 0.1% to 2% by weight and especially from 0.2% to 1.0% by weight, while the values of 0.3%, 0.4%, 0.5%, 0.6%, 0.7%, 0.8% and 0.9% by weight are also suitable.

In addition, a composition according to the present invention advantageously contains less than 10% by weight, preferably less than 5% by weight, more preferably less than 3% by weight, even more preferably less than 2% by weight and especially from 0.001% to 1% by weight, based on the final composition, of volatile organic compounds (VOCs), for example alcohol, such as methanol or ethanol. VOC content can be determined using GC or GC/MS for example; an internal standard may be deployed.

The compositions according to the present invention can be provided with further additives. Useful further additives include inorganic compounds in particulate form, slip agents, corrosion inhibitors, wetting auxiliaries, agents to neutralize/modify the pH and to stabilize the aqueous silane system, and also complexing agents, such as oxalates. It is further possible to use organic film-forming agents based on acrylic esters, acrylic-polyester-polyurethane copolymers, ethylene-acrylic copolymers, polyester resins having free carboxyl groups and also further polymers or polymer dispersions. A composition according to the present invention may advantageously incorporate an aqueous dispersion, for example an $SiO_2$ dispersion, an $Al_2O_3$ dispersion or a $TiO_2$ dispersion. Particle size here may range for example from 1 nm into the μm region.

The present invention further provides an aqueous composition obtainable by the process according to the present invention.

In general, a possible process for producing a composition according to the present invention initially comprises subjecting an aminoalkylalkoxysilane and also optionally further alkoxysilanes mentioned under (i) or corresponding precondensates in the presence or absence of a solvent/diluent to hydrolysis and (block) condensation/cocondensation in the presence of defined amounts of completely ion-free water under generally efficient agitation. The water can be added in one or more portions. Typically, a virtually complete hydrolysis of the alkoxysilanes used and of the water quantity necessary for this is carried out. The reaction can usually be carried out at room temperature up to a temperature for reflux conditions. The reaction can also be carried out in the presence of a hydrolysis/condensation catalyst. Excess volatile organic compounds, especially the hydrolysis alcohol formed, and also deployed solvent/diluent are suitably removed from the resulting reaction/product mixture, for example by distillation under reduced pressure. In addition, the reaction/product mixture can be diluted, and adjusted to a desired concentration, by addition of completely ion-free water. It is further a good idea to check the pH of the stock solution present. This pH can if necessary be adjusted to pH<7 by adding an organic or inorganic aqueous acid. Thereafter, a defined quantity of metal salt—as such or as aqueous solution—can be added in accordance with the present invention to the stock solution under efficient agitation. This is one advantageous way to obtain a generally ready-to-use composition which is in accordance with the present invention. In some cases, it is advantageous to allow the solution to "ripen" at 20° C. for one day. The solution can also be for example heated to 60° C. for 10 minutes.

A composition according to the present invention can also be produced, however, by producing a stock solution A of a silane system as discernible particularly from EP 0 716 127, EP 0 846 716, EP 1 101 787, WO 06/010666 and also WO 2009/030538 (the content of the aforementioned property rights is hereby incorporated in the disclosure of the present application by reference), adjusting it, if necessary, to a desired concentration by diluting with water and/or to a pH<7, preferably <6, more preferably <5 and especially from 2 to 4, although pH 3 is also suitable, by adding an aqueous, organic or inorganic acid, especially acetic acid or nitric acid, and then adding a defined amount of one or more than one metal salt selected according to the present invention or of a corresponding aqueous solution of the metal salt, under efficient agitation. Proceeding from one of the stock solutions mentioned, the process is surprisingly simple and unproblematical. Incidentally, the pH can be determined using Merck pH paper for example.

The subject compositions and/or mixtures can be used with advantage to hydrophobicize substrates or to be more precise substrate surfaces, especially of metals and metal alloys, for example with free hydroxyl functions. Crosslinking with the hydroxyl functions and/or possible complexing and/or reaction of the amino functions provides high solidity to the applied layer on the substrate surfaces. In general, the compositions and/or mixtures can be used for treatment or modification of substrate surfaces, especially for construction of barrier layers on substrate surfaces. The composition/mixtures are preferably used for hydrophobicization of substrate or metal surfaces, for example stainless steel, aluminum, aluminum alloys, steel, i.e., iron alloys or steel alloys, titanium, magnesium, magnesium alloys, copper, copper alloys, zinc, galvanized steel, especially hot dip galvanized steel/iron and also zinc-electroplated steel/iron, or else of glass surfaces, organic materials, especially plastics surfaces, such as polycarbonate, PMMA, PA, composites formed from epoxy resin or UP resin, or more particularly of natural fibers, for example paper, cotton or wood, of mineral surfaces, such as concrete, brick, sandstone, gypsum and also other inorganic surfaces. When the compositions are based on silicon compounds comprising fluorosilanes, in the form of co-condensates or in admixture, even oleophobic and anti-graffiti properties can be obtained with advantage. Further advantageous fields of use open up in the primering of surfaces, of glass, metal, mineral surfaces, such as concrete, mortar, screed, gypsum board or sandstone or organic materials, more particularly of natural fibers, for example paper, cotton or wood. The primering of metal surfaces for example can provide improved adherence and hence inter alia superior corrosion control. Useful coatings include liquid paints, especially solventborne or waterborne paints, such as epoxy paints, 2-part PU paints or other liquid paints. In addition, the composition of the present invention can also be coated with powder paints such as, for example, polyester powder paints, epoxy powder paints or else PVDF powder paints.

A composition according to the present invention or a mixture which is based on such a composition can likewise be used with advantage for corrosion protection on abovementioned metals and also alloys, such as iron, steel, stainless steel, aluminum, aluminum alloys, silver, copper to mention just a few examples. The metals or to be more precise metal surfaces to be protected from corrosion can be pretreated or untreated, examples of treated metal surfaces including in particular phosphatized, chromatized, chromitized, galvanized metal surfaces or galvanized metal surfaces which have additionally been chromatized, chromitized or phosphatized. Chromatized metal surfaces are generally metal surfaces treated/passivated with a chromium(VI)-containing agent. By analogy, chromitized metal surfaces are metal surfaces treated/passivated with a chromium(III)-containing agent. In addition, the aqueous compositions can be used for rock consolidation in oil production, for example in the production of ready-made concrete and/or mortar structural components, such as pipes etc., or in aqueous paint or resin formulations. According to a further possible use, the compositions of the present invention can be further modified in their product properties by addition of additives and/or fillers in particular. For instance, adding a flow auxiliary can provide improved distribution on a surface. Addition of catalysts, for example zirconium n-propoxide, or modifying the pH can speed the curing of the final composition.

The invention also provides coated or consolidated products obtained by using the subject composition and/or mixtures. Especially coated glasses, coated acrylic glass, corrosion-protected metals or corrosion-protected, mineral substrates, such as hardened concrete or mortar, or the organic materials mentioned, especially products of treated or coated natural fibers, must be mentioned here. Examples thereof are reinforcements treated with a composition according to the present invention, which are coated with the composition before their use in concrete. In addition, even an incompletely hardened concrete mixture can be mixed with a composition according to the present invention, processed and subsequently hardened. Care must be taken here to ensure that the composition stays workable, for example by choosing the correct pH or other parameters. This provides for example hydrophobic, corrosion-resistant concrete or products composed of concrete, such as drainpipes or ready-made structural components for buildings. The concrete thus treated has an appreciably better corrosion resistance to environmental influences.

Therefore, the present invention likewise provides for the use of a composition according to the present invention for treating a substrate surface, wherein the use of a composition according to the present invention for treating a metal surface against corrosion is particularly preferred and a corrosion control coat is obtained in an advantageous manner on the metal substrate treated.

The present invention thus likewise provides a corrosion control coat/coating based on a treatment with a composition according to the present invention. In addition, such a corrosion control coat can rest on a layer based on a composition according to the present invention and at least one further layer, for example on the foundation of a powder paint or of a liquid paint.

Objects/articles having a surface of said metals are protected against corrosion in a durable and thus particularly advantageous manner. It is particularly interesting that the corrosion control coating described prevents pitting corrosion in aluminum alloys.

Therefore, objects or articles based on a treatment with a composition according to the present invention likewise form part of the subject matter of the present invention.

The examples which follow illustrate the invention.

EXAMPLES

Comparative Composition VL 1

1 kg of stock solution (VL1 stock solution) was produced as described in Example 5 of EP 0 716 127 B1 except that 60.0 g of 85% formic acid were used instead of HCl. To conduct the comparative tests, 2.53 g of VL1 stock solution were diluted with 97.47 g of completely ion-free water under agitation (VL1).

Comparative Composition VL 2

1 kg of stock solution (VL2 stock solution) was produced as described in Example 1 of WO 2009/030538 A1 except that 13.0 g of 85% formic acid were used instead of 17.16 g of 85% formic acid.

To conduct the comparative tests 10 g of VL2 stock solution were diluted with 90 g of completely ion-free water under agitation (VL2).

Comparative Composition VL 3

1 kg of stock solution (VL3 stock solution) was produced as described in Example 1 of WO 2007/085339 A2.

To conduct the comparative tests 9.0 g of VL3 stock solution were admixed with 0.02 g of BYK 348 and diluted with 90.98 g of completely ion-free water under agitation (VL3).

Comparative Composition VL 4

0.5% (w/w) Cr(III) nitrate×9$H_2O$, 99.5% of $H_2O$

Comparative Composition VL 5

1.25% of Surtec LC 680, 98.75% of $H_2O$ (The aqueous solution contains $Cr^{3+}$ and $Co^{2+}$ ions.)

Comparative Composition VL 6

1 kg of stock solution (VL6 stock solution) was produced as described in Example 1 of EP 0 716 127 B1 except that 930 g of completely ion-free water were added instead of 126 g of water and 114 g of HCl (32% by weight in water) followed by stirring at 55° C. for 2 h. The ethanol-water mixture was subsequently distilled off. The final weight of the product was 984 g.

To conduct the comparative tests 7.5 g of VL6 stock solution were diluted with 92.5 g of completely ion-free water under agitation (VL 6).

Comparative Composition VL 7

[16.6% (w/w) of VL2 stock solution, 83.4% of $H_2O$]
16.6 g of VL-2 stock solution were diluted with 83.4 g of completely ion-free water.

Comparative Composition VL 8

[13.3% (w/w) of VL2 stock solution, 86.7% of $H_2O$]
13.3 g of VL-2 stock solution were diluted with 86.7 g of completely ion-free water.

Example 1

Producing Inventive Compositions A1

Composition A1a1:
2.53 g of VL1 stock solution were diluted with 50 g of completely ion-free water. 0.5 g of Cr(III) nitrate×9H$_2$O was dissolved in 46.97 g of completely ion-free water and added to the diluted stock solution under agitation.

Composition A1a2:
7.5 g of VL6 stock solution were diluted with 50 g of completely ion-free water. 0.5 g of Cr(III) nitrate×9H$_2$O was dissolved in 46.25 g of completely ion-free water and added to the diluted stock solution under agitation.

Example 2a

Producing Inventive Compositions A2

Composition A2a1:
16.6 g of VL2 stock solution were diluted with 40 g of completely ion-free water. 0.5 g of Cr(III) nitrate×9H$_2$O was dissolved in 42.9 g of completely ion-free water and added to the diluted stock solution under agitation.

Composition A2a2:
10.0 g of VL2 stock solution were diluted with 40 g of completely ion-free water. 0.5 g of Cr(III) nitrate×9H$_2$O was dissolved in 49.5 g of completely ion-free water and added to the diluted stock solution under agitation.

Example 2b

Producing Inventive Compositions A2

Composition A2b1:
5.5 g of VL2 stock solution were diluted with 40 g of completely ion-free water. 0.5 g of Al(III) nitrate×9H$_2$O was dissolved in 54.0 g of completely ion-free water and added to the diluted stock solution under agitation.

Composition A2b2:
16.6 g of VL2 stock solution were diluted with 40 g of completely ion-free water. 0.5 g of Al(III) nitrate×9H$_2$O was dissolved in 42.9 g of completely ion-free water and added to the diluted stock solution under agitation.

Example 2c

Producing Inventive Compositions A2

Composition A2c:
5.5 g of VL2 stock solution were diluted with 40 g of completely ion-free water. 0.5 g of Ce(III) nitrate×6H$_2$O was dissolved in 42.9 g of completely ion-free water and added to the diluted stock solution under agitation.

Example 3

Producing the Inventive Composition B1

Composition B1:
2.53 g of VL3 stock solution were admixed with 0.02 g of BYK 348 and diluted with 40 g of completely ion-free water. 0.5 g of Cr(III) nitrate×9H$_2$O was dissolved in 50.48 g of completely ion-free water and added to the previously diluted solution under agitation.

All inventive compositions as per Examples 1 to 3 were stable in storage at room temperature for more than 3 months.

Example 4

Composition A2aX

[13.3% (w/w) of VL2 stock solution, 0.5% of Cr(III) nitrate×9H$_2$O]

13.3 g of VL2 stock solution were diluted with 40 g of completely ion-free water. 0.5 g of Cr(III) nitrate×9H$_2$O was dissolved in 46.2 g of completely ion-free water and added to the diluted stock solution under agitation.

The compositions thus produced were used after one day of pot life.

USE EXAMPLES

Cleaning of Hot Dip Galvanized Steel Panels (HDG 4 Chemetall)

The galvanized steel panels were cleaned with an organic solvent (ethyl acetate) and subsequently placed in an alkaline cleaning bath (composition: 10.0 g/l of S 5610 (Chemetall), pH 11.5, 60° C., 30 sec). After alkaline cleaning, the metal substrates were rinsed with hot water initially and then with completely ion-free water.

Corrosion Tests

The corrosion tests were carried out in a salt spray mist (testing to DIN 50021-SS).

Use Example 1

Hot Dip Galvanized Steel Panels

They were cleaned as described under "Cleaning of hot dip galvanized steel panels". The cleaned sample panels were treated with the following solutions:
 a) reference no treatment
 b) composition A2a1 [16.6% (w/w) of VL2 stock solution, 0.5% of Cr(III) nitrate×9H$_2$O, 82.9% of H$_2$O]
 c) composition A2a2 [10.0% (w/w) of VL2 stock solution, 0.5% of Cr(III) nitrate×9H$_2$O, 89.5% of H$_2$O]
 d) comparative composition VL2 [10.0% (w/w) of VL2 stock solution, 90.0% of H$_2$O]

The metal substrates were dipped into the solution at 20° C. for 30 sec, dried at 20° C. for 5 min and finally cured at 80° C. for 10 min.

After 24 h the coated metal substrates were placed in the salt spray mist chamber.

Picture 1 shows the results after 211 h in salt spray mist.

Results:
 a) the reference shows white rust on the entire surface
 b) small traces of white rust at the edge
 c) small traces of white rust at the edge and at a few places in the middle
 d) virtually the entire area is covered with white rust

Use Example 2

Hot Dip Galvanized Steel Panels

They were cleaned as described under "Cleaning of hot dip galvanized steel panels".

The cleaned sample panels were treated with the following solutions:
a) reference no treatment
b) composition A2b1 [5.5% (w/w) of VL2 stock solution, 0.5% of Al(III) nitrate×9H$_2$O, 94.0% of H$_2$O]
c) composition A2b2 [16.6% (w/w) of VL2 stock solution, 0.5% of Al(III) nitrate×9H$_2$O, 82.9% of H$_2$O]
d) comparative composition VL2 [10.0% (w/w) of VL2 stock solution, 90.0% of H$_2$O]
e) comparative composition VL4 [0.5% (w/w) of Cr(III) nitrate×9H$_2$O, 99.5% of H$_2$O]
f) composition A2c [5.5% (w/w) of VL2 stock solution, 0.5% of cerium(III) nitrate×6H$_2$O]

The metal substrates were dipped into the solution at 20° C. for 30 sec, dried at 20° C. for 5 min and finally heated at 80° C. for 10 min.

After 24 h the coated metal substrates were placed in the salt spray mist chamber.

Picture 2 shows the results after 66 h in salt spray mist.
Results:
a) white rust formation on entire surface
b) white rust formation partially on entire surface
c) little white rust
d) white rust formation on entire surface
e) white rust formation on entire surface
f) white rust formation in upper part Use Example 3

Zinc Phosphatized Steel Panels

They were cleaned as described under "Cleaning of hot dip galvanized steel panels", except that the pH of completely ion-free water was adjusted to 10 with S 5610.

The cleaned sample panels were treated with the following solutions:
a) reference no treatment
b) composition A2a2 [10.0% (w/w) of VL2 stock solution, 0.5% of Cr(III) nitrate×9H$_2$O, 82.9% of H$_2$O]
c) comparative composition VL4 [0.5% of Cr(III) nitrate× 9H$_2$O, 99.5% of H$_2$O]
d) comparative composition VL5 [1.25% of Surtec LC 680, 98.75% of H$_2$O]
e) comparative composition VL2 [10.0% (w/w) of VL2 stock solution, 90.0% of H$_2$O]

The metal substrates were dipped into the solution at 20° C. for 30 sec, dried at 20° C. and stored at 20° C. for altogether 24 h.

After 24 h the coated metal substrates were placed in the salt spray mist chamber.

Picture 3 shows the results after 180 h in salt spray mist.
Results:
a) red rust on entire surface
b) islands of white rust
c) a very great deal of red rust and a little white rust
d) many islands of white rust
e) red rust mainly Use Example 4

Galvanized Steel Panels

They were cleaned as described under "Cleaning of hot dip galvanized steel panels".

The cleaned sample panels were treated with the following solutions:

a) reference no treatment
b) comparative composition VL3 [9.0% (w/w) of VL3 stock solution, 0.02% of BYK 348, 90.98% of H$_2$O]
c) composition B1 [9.0% (w/w) of VL3 stock solution, 0.02% of BYK 348, 0.5% of Cr(III) nitrate×9H$_2$O, 90.48% of H$_2$O]

The metal substrates were dipped into the solution at 20° C. for 30 sec, dried at 20° C. for 5 min and finally heated at 200° C. for 10 min.

After 24 h the coated metal substrates were placed in the salt spray mist chamber.

Picture 4 shows the result after 55 h in salt spray mist.
Results:
a) entire piece covered with white rust
b) white rust also in the piece
c) white rust in piece, but better than b)

Use Example 5

Galvanized Steel Panels

They were cleaned as described under "Cleaning of hot dip galvanized steel panels".

The cleaned sample panels were treated with the following solutions:
a) reference no treatment
b) comparative composition VL1 [2.53% (w/w) of VL1 stock solution, 97.47% of H$_2$O]
c) composition A1a1 [2.53% (w/w) of VL1 stock solution, 0.5% of Cr(III) nitrate×9H$_2$O, 96.97% of H$_2$O]

The metal substrates were dipped into the solution at 20° C. for 30 sec, dried at 20° C. for 5 min and finally heated at 120° C. for 10 min.

After 24 h the coated metal substrates were placed in the salt spray mist chamber.

Picture 5 shows the results after 50 h in salt spray mist.
Results:
a) entire piece covered with white rust
b) white rust distributed over entire piece
c) less white rust, but distributed over entire piece Use Example 6

Galvanized Steel Panels

They were cleaned as described under "Cleaning of hot dip galvanized steel panels".

The cleaned sample panels were treated with the following solutions:
a) reference no treatment
b) comparative composition VL1 [2.53% (w/w) of VL1 stock solution, 97.47% of H$_2$O]
c) composition A1a1 [2.53% (w/w) of VL1 stock solution, 0.5% of Cr(III) nitrate×9H$_2$O, 96.97% of H$_2$O]
d) comparative composition VL 6 [7.5 g of VL6 stock solution were diluted with 92.5 g of completely ion-free water under agitation (VL 6)]
e) composition A1a2 [7.5% (w/w) of VL6 stock solution, 0.5% of Cr(III) nitrate×9H$_2$O, 92% of completely ion-free water]

The metal substrates were dipped into the solution at 20° C. for 30 sec, dried at 20° C. for 5 min and finally heated at 180° C. for 10 min.

After 24 h the coated metal substrates were placed in the salt spray mist chamber.

Picture 6 shows the results after 55 h in salt spray mist.

Results:
a) entire piece covered with white rust
b) large portions of piece feature white rust
c) very few islands of white rust
d) little white rust over entire piece
e) a few islands of white rust Use Example 7

Cleaning of aluminum panels (alloy 5005 H24, size 76×152 mm)

The aluminum panels were placed in an alkaline cleaning bath (composition: 10 g of Ridoline C72 RS, pH ca. 13, 60° C., 30 seconds). After alkaline cleaning, the panels were rinsed with hot water initially and then with completely ion-free water. Thereafter, the panels were placed in an acidic descaling bath (composition: 10% of $HNO_3$, 2 minutes, room temperature). Thereafter the descaled panels were rinsed with completely ion-free water and blown dry with nitrogen.

Coating the Aluminum Panels

They were cleaned as described above under "Cleaning of aluminum panels". The cleaned aluminum panels were treated with the following solutions:
a) reference no treatment
b) composition A2a1 [16.6% (w/w) of VL2 stock solution, 0.5% of Cr(III) nitrate×9$H_2O$, 82.9% of $H_2O$]
c) composition A2aX [13.3% (w/w) of VL2 stock solution, 0.5% of Cr(III) nitrate×9$H_2O$, 86.2% of $H_2O$]
d) composition A2a2 [10.0% (w/w) of VL2 stock solution, 0.5% of Cr(III) nitrate×9$H_2O$, 89.5% of $H_2O$]
e) comparative composition 1 [16.6% (w/w) of VL2 stock solution, 83.4% of $H_2O$]
f) comparative composition 2 [13.3% (w/w) of VL2 stock solution, 86.7% of $H_2O$]
g) comparative composition 3 [10.0% (w/w) of VL2 stock solution, 90.0% of $H_2O$]

The aluminum panels were dipped into the solution at 20° C. for 30 sec and then cured at 80° C. for 10 minutes.

After 24 h the coated aluminum panels were placed in the salt spray chamber.

Picture 7 shows the results after 145 h in salt spray mist.
Results:
a) the reference shows corrosion on the entire surface
b) slight corrosion on entire surface
c) no corrosion
d) no corrosion
e) to g) corrosion on entire surface

The invention claimed is:

1. A process for producing an aqueous composition, the process comprising:
(i) hydrolyzing and condensing at least one aminoalkylalkoxysilane selected from the group consisting of a monoaminoalkylalkoxysilane, a bisaminoalkylalkoxysilane and a trisaminoalkylalkoxysilane, and optionally at least one alkoxysilane selected from the group consisting of a fluoroalkylalkoxysilane, an alkylalkoxysilane and a tetraalkoxysilane, within a reaction mixture, in the presence of at least one catalyst and water and optionally at least one solvent/diluent; then
(ii) at least partially removing from the reaction mixture the solvent/diluent and a hydrolysis alcohol, which is formed during the hydrolyzing and condensing (i);
(iii) optionally adding additional water or an aqueous acid to the reaction mixture, such that the pH of the reaction mixture is adjusted to a value in the range from 2 to less than 7; and subsequently
(iv) adding a metal salt selected from the group consisting of an acetate salt or a nitrate salt of aluminum, chromium in oxidation state 3+, and cerium in oxidation state 3+ or 4+.

2. The process of claim 1, wherein the metal salt is at least one of a nitrate salt of $Cr^{3+}$ and an acetate salt of $Cr^{3+}$.

3. The process of claim 1, wherein a concentration of the metal salt is from 0.01% to 6% by weight, based on the aqueous composition.

4. An aqueous composition obtained by the process of claim 1.

5. A process for treating a substrate surface, the process comprising contacting the substrate surface with the aqueous composition of claim 4.

6. The process of claim 5, wherein the substrate surface is a metal surface and the treated metal surface is protected against corrosion.

7. A corrosion control coating, obtained according to the process of claim 5.

8. The corrosion control coating of claim 7, further comprising a foundation layer of a powder paint or a liquid paint.

9. An article, comprising a coating obtained by treatment with the aqueous composition of claim 4.

10. The process of claim 1, wherein the metal salt is a $Cr^{3+}$ nitrate or acetate or a mixture of metal nitrates and acetates comprising $Cr^{3+}$.

11. The process of claim 1, wherein the metal acetate or nitrate is comprises a mixture of metal components selected from the group consisting of
a mixture of $Cr^{3+}$ and $Al^{3+}$,
a mixture of $Cr^{3+}$ and $Ce^{3+}$,
a mixture of $Cr^{3+}$ and $Ce^{4+}$,
a mixture of $Cr^{3+}$, $Ce^{3+}$ and $Ce^{4+}$,
a mixture of $Cr^{3+}$, $Al^{3+}$ and $Ce^{3+}$ and
a mixture of $Cr^{3+}$, $Al^{3+}$, $Ce^{4+}$ and $Ce^{3+}$ salts.

12. The corrosion control coating of claim 7, wherein the coated substrate comprises aluminum.

* * * * *